G. W. WELLS.
FRICTION GEARING.
APPLICATION FILED NOV. 11, 1908.

917,691.

Patented Apr. 6, 1909.
2 SHEETS—SHEET 1.

WITNESSES
C. K. Davies.
Ralph Wormelle.

INVENTOR
Geo. W. Wells,
By F. E. Stebbins.
Attorney

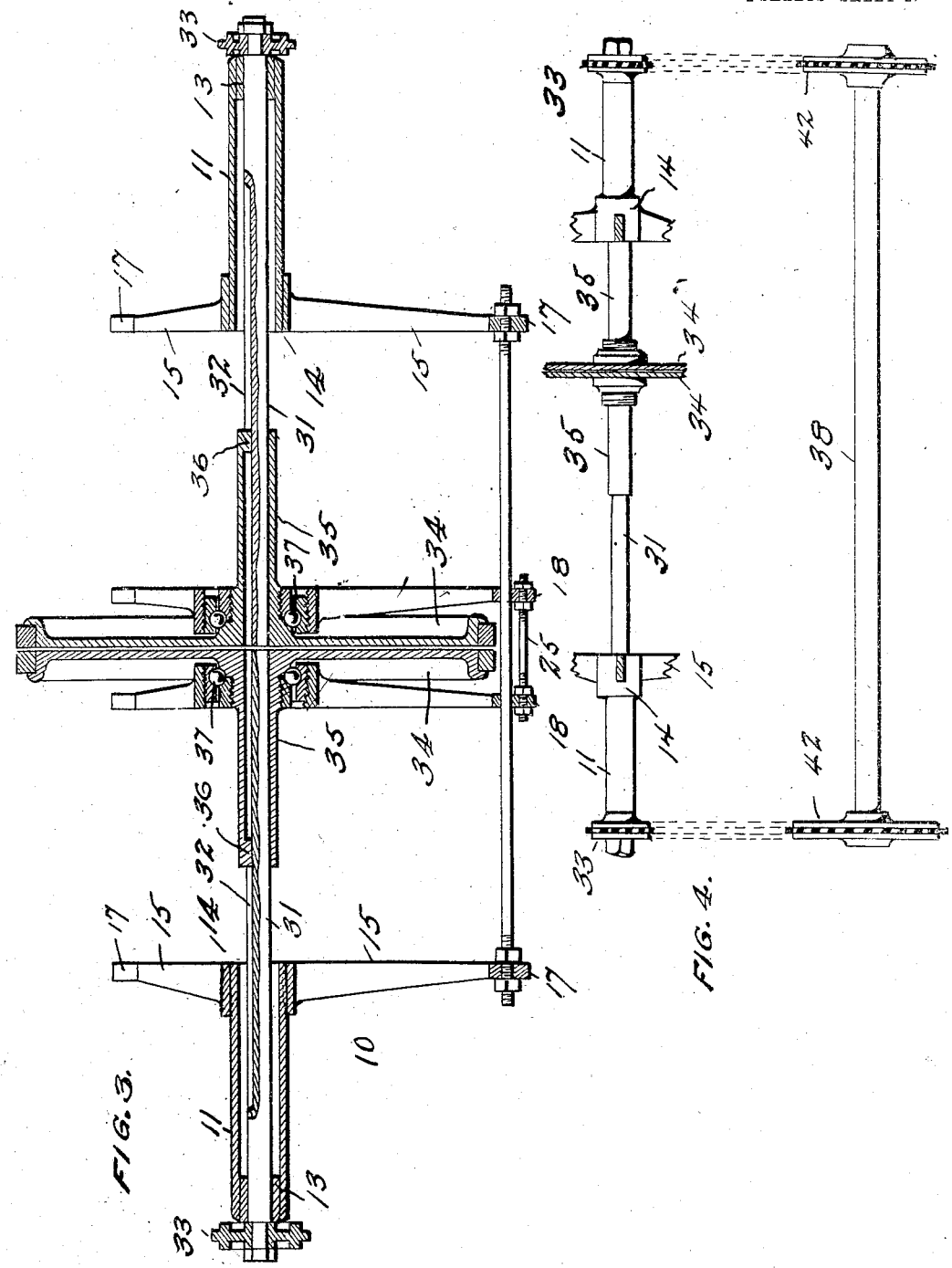

UNITED STATES PATENT OFFICE.

GEORGE W. WELLS, OF AMESBURY, MASSACHUSETTS, ASSIGNOR OF ONE-HALF TO DUDLEY J. MARSTON.

FRICTION-GEARING.

No. 917,691.          Specification of Letters Patent.          Patented April 6, 1909.

Application filed November 11, 1908. Serial No. 462,162.

*To all whom it may concern:*

Be it known that I, GEORGE W. WELLS, a citizen of the United States, residing at Amesbury, in the county of Essex and State of Massachusetts, have invented certain new and useful Improvements in Friction-Gearing, of which the following is a specification.

The object of my invention is the provision of a friction gearing, especially adapted for use in propelling vehicles, such as automobiles, and for other purposes, wherein a friction disk and two friction wheels are employed and motion transmitted without relative excessive grinding or abrading friction and without the use of complicated balance gearing.

The invention consists in certain novelties of construction and combinations of parts as hereinafter set forth and claimed.

The accompanying drawings illustrate an example of the physical embodiment of the invention and a modification constructed according to the best modes I have so far devised for the practical application of the principle.

Figure 1:
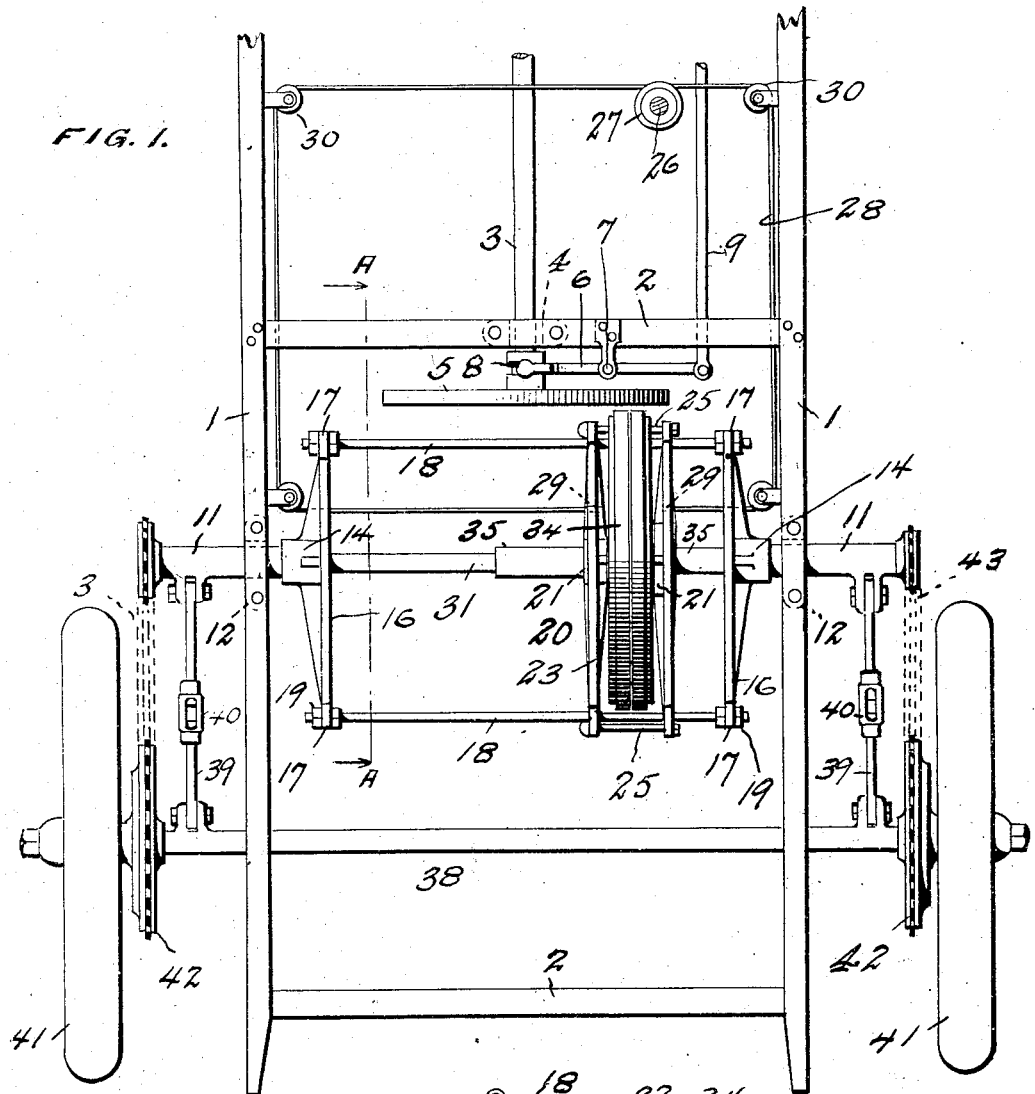
Figure 2:
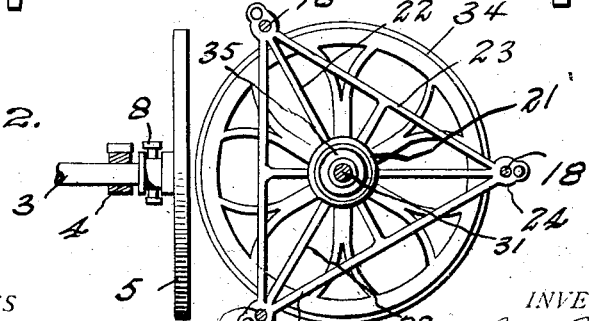

Figure 1 shows part of an automobile frame and a pair of wheels with the friction gearing adapted mediately to revolve the same. Fig. 2 is a view of the gearing as seen when looking in the direction of the arrows on line A A of Fig. 1. Fig. 3 is an enlarged longitudinal section of the friction wheels, counter shafts, sprocket wheels, and skeleton supporting frame; the counter shafts also being shown in section. Fig. 4 shows a modified construction of the transmission means between the counter shafts and wheels.

Referring to the several figures, the numeral 1 designates the longitudinal members of the frame of the vehicle which may be of any desired construction; 2, the crossbars rigidly uniting the said members; 3, a rotary shaft supported in a bearing 4 secured to the under surface of the front cross-bar, said shaft being, in this instance, adapted for operative connection with a motor of any kind; 5, a friction disk with a hub movable on the shaft; 6, a shifting lever pivoted to a bearing 7 on the crossbar, one end thereof, 8, engaging a circular recess in the hub of the disk and the other end pivoted to a rod 9 adapted to connect with a foot lever suitably located; 10, a skeleton frame consisting of the tubular end pieces 11 11 movably secured by clips 12, 12 of any kind to the under surfaces of the two longitudinal members of the frame, the bearings 13, 13 for the counter shafts located in the extreme outer ends of the tubular portions, the hubs 14, 14 upon the inner ends of the tubular portions, the arms 15 radiating from the said hubs, the bars or rods 16 uniting the ends of the arms, the perforated lugs or bosses 17 located at the meeting points of the arms and bars, and the rods 18 passed through the perforations in the said lugs and secured by the nuts 19 upon the threaded ends of the rods; 20, the friction wheel supporting the shifting cage comprising two hubs 21, arms 22 radiating from the hubs, bars 23 uniting the ends of the arms, lugs 24 each having two holes, rods 25 passed through the outer holes and secured by nuts, as shown, and the said cage being movably mounted upon the rods 18 of the skeleton frame, the said rods loosely passing through the inner holes of the lugs 24 at the ends of the arms which radiate from the hubs; 26, a shaft adapted to be supported so it can be revolved by a wheel or crank within the body of the vehicle; 27, a grooved wheel at the end of the shaft; 28, a wire cable having its ends at 29, 29 secured to opposite sides of the cage and the part between the ends engaging pulleys 30, supported in bearings on the frame, and passed several times around the grooved wheel 27, the said cable and shaft constituting means for shifting the cage upon the rods of the skeleton frame; 31, counter shafts, each provided with a groove 32 and supported at its end in a bearing 13 as shown; 33, sprocket wheels fixed on the shafts; 34, friction wheels of any desired construction each having an elongated hub 35 provided with a lug or spline 36 seated and movable within a groove 32 of a counter shaft; 37, ball bearings between the hubs of the friction wheels and the hubs of the shifting cage; 38, in this instance, a fixed axle; 39, rods connecting the axle and tubes of the skeleton frame, each provided with a turn-buckle 40 or other adjustable means; 41, the traction wheels on the axle; 42, sprocket wheels upon the hubs of the wheels; and 43 sprocket chains connecting the sprockets on the traction wheel hubs with the sprocket wheels on the counter shafts.

It is to be understood that the specific parts and elements shown and mentioned may be changed in shape and construction, as the illustration is for showing only one embodiment of the invention, and in connection with a vehicle.

The specific mode of operation is as follows: The shaft 3 and disk 5 being rotated, the latter is brought into contact with the two friction wheels 34, 34 by moving the rod 9 and lever 6, as is obvious. Each friction wheel transmits rotary motion to a counter shaft carrying a sprocket wheel, which latter transmits motion through a sprocket chain to a traction wheel.

Inasmuch as the two friction wheels are located at unequal distances from the center of the disk 5, one will revolve at greater speed than the other, consequently the sprocket wheel on the counter shaft rotated by the friction wheel farthest from the center is of less diameter, as shown, than the sprocket wheel on the other counter shaft.

In the modification, Fig. 4, the sprocket wheels on the counter shafts are of the same diameter and the sprocket wheels on the hubs of the traction wheels are of different diameters, which effects the same result, that is, the imparting of equal or uniform motion to the traction wheels. The diameters of all the sprocket wheels may also be different from those shown and the same result be secured, as is quite obvious. To revolve the traction wheels in the opposite direction the shaft 26 is revolved and the cage supporting the friction wheels shifted upon the rods 18 to a position where the friction wheels will bear upon the disk at the opposite side of the shaft 3 which transmits motion to the disk. It is clear that when the vehicle is being forwardly propelled the use of two friction wheels enables much more energy to be transmitted to the traction wheels than when a single friction wheel is employed.

The main parts of the gearing may be used for other purposes besides the propulsion of a vehicle, power being transmitted to other rotary elements by the rear sprocket wheels or their equivalents and uniform motion imparted. Again, power may be applied to the rear sprocket wheels or their equivalents and through the intermediate elements to the friction wheels and friction disk and shaft.

What I claim is:

1. The combination in a gearing, of a friction disk; two separate counter shafts disposed in line; two friction wheels mounted side by side upon the extreme adjacent ends of the separate counter shafts; rotary elements; and means connecting the rotary elements with the counter shafts, said means being so constructed as to impart uniform rotary motion to the said rotary elements.

2. The combination in a gearing, of two counter shafts disposed in line end to end, two wheels, one on the outer end of each counter shaft; two friction wheels located side by side, one mounted upon each counter shaft; a friction disk in contact with the two friction wheels; and two rotary elements in gear with the wheels at the ends of the counter shafts; the relation of the two rotary elements and the wheels upon the counter shafts being such that uniform rotary motion may be transmitted to the said two rotary elements by the disk, or vice versa, when the two friction wheels revolve with different velocities.

3. The combination in a gearing, of a rotary shaft and friction disk; two friction wheels located side by side; two separate counter shafts arranged in line end to end, each at its inner end connected with a friction wheel; wheels upon the counter shafts; two traction wheels; sprocket wheels for rotating said traction wheels; and sprocket chains; the diameters of the wheels upon the ends of the counter shafts having such relation to the sprocket wheels that uniform motion is transmitted to the traction wheels.

4. The combination in a gearing, of a rotary shaft and friction disk; two friction wheels; two separate counter shafts, each shaft connected with a friction wheel; a wheel upon each counter shaft; two traction wheels; sprocket wheels for transmitting motion to the traction wheels; and sprocket chains connecting the wheels upon the counter shafts with the said sprocket wheels; the relative diameters of the said wheels upon the counter shafts and the said sprocket wheels being such that uniform motion can be transmitted to the traction wheels.

5. The combination in a gearing, of a rotary shaft and friction disk; two friction wheels; two separate counter shafts, each shaft connected with a friction wheel; a wheel upon each counter shaft; a frame supporting the counter shafts and two friction wheels; two traction wheels; sprocket wheels for transmitting motion to the traction wheels; and sprocket chains connecting the wheels upon the counter shafts with the said sprocket wheels; the relative diameters of the said wheels upon the counter shafts and the said sprocket wheels being such that uniform motion can be transmitted to the traction wheels.

6. The combination in a gearing, of a rotary shaft and friction disk; two friction wheels; two separate counter shafts, each shaft connected with a friction wheel; a wheel upon each counter shaft; a frame supporting the counter shafts and two friction wheels, said frame consisting of two tubes with hubs and radiating arms united by rods; two traction wheels; sprocket wheels for transmitting motion to the traction wheels; and sprocket chains connecting the wheels upon the counter shafts with the said sprocket wheels; the relative diameters of the said wheels upon the counter shafts and the said sprocket wheels being such that uniform motion can be transmitted to the traction wheels.

7. The combination in a gearing, of a rotary shaft and friction disk; two friction wheels; two separate counter shafts, each shaft connected with a friction wheel; a wheel upon each counter shaft; a cage supporting the friction wheels; a frame supporting the counter shafts and cage, said cage being movable upon the frame; means for moving the cage relative to the frame; two traction wheels; sprocket wheels for transmitting motion to the traction wheels; and sprocket chains connecting the wheels upon the counter shafts with the said sprocket wheels; the relative diameters of the said wheels upon the counter shafts and the said sprocket wheels being such that uniform motion can be transmitted to the traction wheels.

8. The combination in a gearing, of a rotary shaft and friction disk; two friction wheels; two separate counter shafts, each shaft connected with a friction wheel; a wheel upon each counter shaft; means supporting the two friction wheels movable relative to the friction disk; means for moving the two friction wheels relative to the face of the friction disk; two traction wheels; sprocket wheels for transmitting motion to the traction wheels; and sprocket chains connecting the wheels upon the counter shafts with the said sprocket wheels; the relative diameters of the said wheels upon the counter shafts and the said sprocket wheels being such that uniform motion can be transmitted to the traction wheels.

9. The combination in a gearing, of a rotary shaft and friction disk; two friction wheels; two separate counter shafts, each shaft connected with a friction wheel; a wheel upon each counter shaft; two traction wheels; sprocket wheels for transmitting motion to the traction wheels; and sprocket chains connecting the wheels upon the counter shafts with the said sprocket wheels; the relative diameters of the said wheels upon the counter shafts and the said sprocket wheels being such that uniform motion can be transmitted to the traction wheels; and said friction wheels being located side by side and bodily movable simultaneously relative to the friction disk.

10. The combination in a gearing, of a rotary shaft and friction disk; two friction wheels; two separate counter shafts, each shaft connected with a friction wheel; a wheel upon each counter shaft; two traction wheels; sprocket wheels for transmitting motion to the traction wheels; and sprocket chains connecting the wheels upon the counter shafts with the said sprocket wheels; the relative diameters of the said wheels upon the counter shafts and the said sprocket wheels being such that uniform motion can be transmitted to the traction wheels; and said counter shafts each having a longitudinal groove and said friction wheels having hubs each with a lug or spline movable within a groove in a counter shaft.

11. The combination in a gearing, of a rotary shaft and friction disk; two friction wheels; two separate counter shafts, each shaft connected with a friction wheel; a wheel upon each counter shaft; two traction wheels; sprocket wheels for transmitting motion to the traction wheels; and sprocket chains connecting the wheels upon the counter shafts with the said sprocket wheels; the relative diameters of the said wheels upon the counter shafts and the said sprocket wheels being such that uniform motion can be transmitted to the traction wheels; means being provided for moving the counter shafts and their wheels relative to the said sprocket wheels for adjusting the sprocket chains.

12. The combination in a gearing, of a rotary shaft and friction disk; two friction wheels; two separate counter shafts, each shaft connected with a friction wheel; a wheel upon each counter shaft; two traction wheels; sprocket wheels for transmitting motion to the traction wheels; and sprocket chains connecting the wheels upon the counter shafts with the said sprocket wheels; the relative diameters of the said wheels upon the counter shafts and the said sprocket wheels being such that uniform motion can be transmitted to the traction wheels; and said sprocket wheels being secured to the hubs of the traction wheels.

13. The combination in a gearing, of a rotary shaft and friction disk; two friction wheels; two separate counter shafts, each shaft connected with a friction wheel; a wheel upon each counter shaft; two traction wheels; sprocket wheels for transmitting motion to the traction wheels; and sprocket chains connecting the wheels upon the counter shafts with the said sprocket wheels; the wheels upon the counter shafts being of different diameters, and the sprocket wheels of the same diameter.

14. The combination in a gearing, of a rotary shaft and friction disk; two friction wheels; two separate counter shafts, each shaft connected with a friction wheel; a wheel upon each counter shaft; two traction wheels; sprocket wheels for transmitting motion to the traction wheels; and sprocket chains connecting the wheels upon the counter shafts with the said sprocket wheels; the sums of the diameters of each sprocket wheel and the wheel upon the counter shaft to which it is connected being different, whereby uniform motion may be transmitted to the traction wheels.

In testimony whereof I affix my signature, in the presence of two witnesses.

GEORGE W. WELLS

Witnesses:
 ALLISON P. YERXA,
 CHARLES W. PUTNAM.